May 15, 1934.  O. G. SIMMONS  1,958,958
METHOD OF GENERATING HOURGLASS WORMS
Filed July 3, 1930
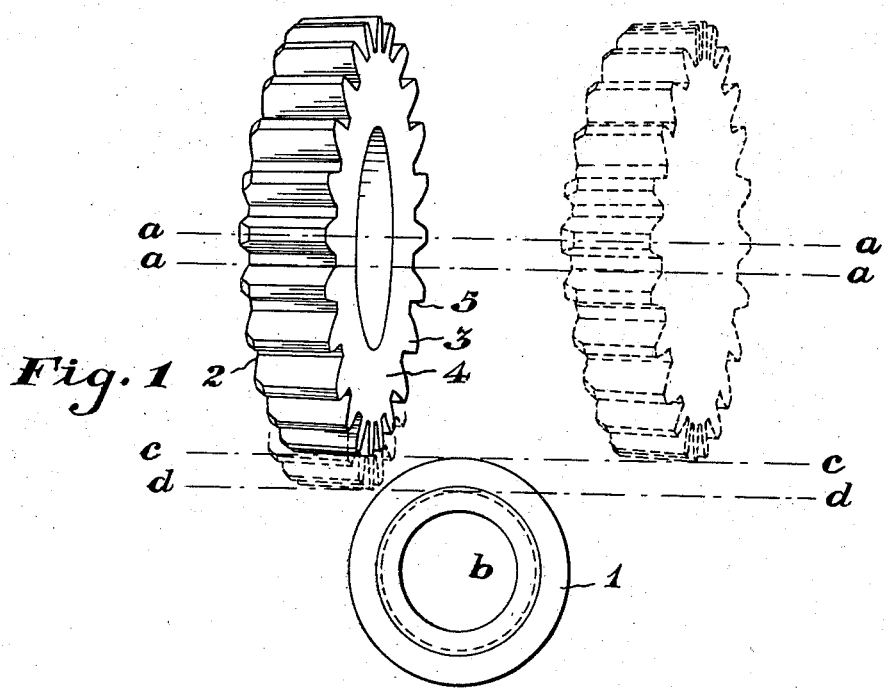
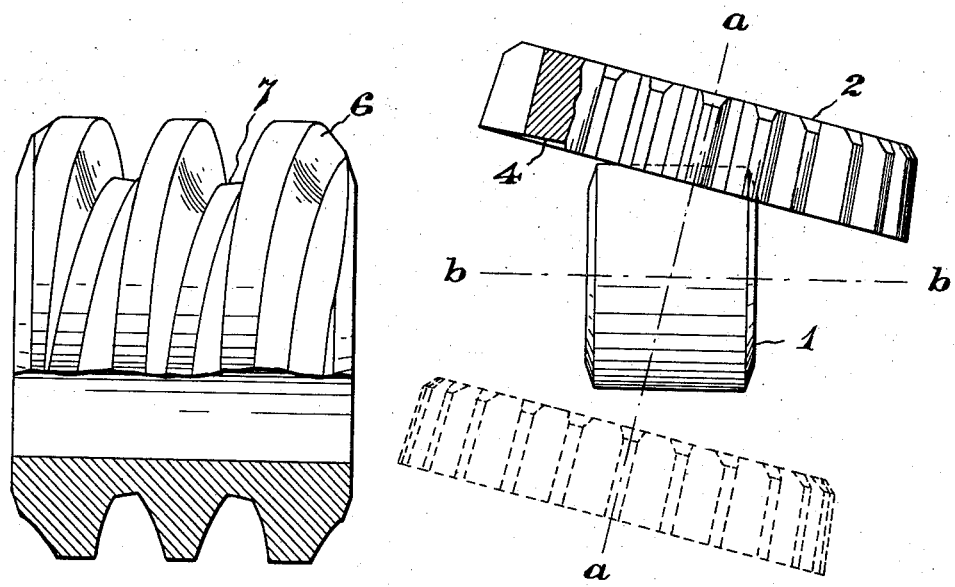
Fig. 1
Fig. 3
Fig. 2
INVENTOR
Oliver G. Simmons.

Patented May 15, 1934

1,958,958

UNITED STATES PATENT OFFICE 1,958,958

METHOD OF GENERATING HOURGLASS WORMS

Oliver G. Simmons, Lakewood, Ohio

Application July 3, 1930, Serial No. 465,491

11 Claims. (Cl. 90—9)

This invention relates to a method of generating worms of the hour-glass type which have one or more helical grooves gradually increasing in depth from the opposite ends of the worm to the center thereof to conform to the periphery of a gear of a predetermined size meshing with the worm and disposed with its axis at an angle to the axis of the worm.

The present invention has for its object to provide a method of cutting worms of the character described with a rotary intermeshing cutter such as a gear shaper cutter operating on the molding generating principle, whereby the worms may be rapidly and accurately cut.

A further object of the invention is to provide a method by which hour-glass worms may be generated with a straight tooth gear shaper cutter.

A further object of the invention is to provide a method of generating hour-glass worms which can be performed in a gear shaper such as disclosed in my copending application Serial No. 443,185, filed April 10, 1930.

With the above and other objects in view, the invention may be said to comprise the method as illustrated in the accompanying drawing hereinafter described and particularly set forth in the appended claims, together with such variations and modifications thereof as will be apparent to one skilled in the art to which the invention appertains.

Reference should be had to the accompanying drawing forming a part of this specification in which:

Fig. 1 is a diagrammatic view in side elevation showing the cutter in full lines at the beginning of its reciprocating stroke and in the position which it occupies at the beginning of the cutting operation, the cutter being shown in dotted lines at the forward end of its reciprocating stroke and in dotted lines in the position to which it is fed during the cutting operation.

Fig. 2 is a diagrammatic plan view showing the cutter and blank, the cutter being shown in full lines at the beginning of its reciprocating stroke and in dotted lines at the forward end of its stroke.

Fig. 3 is a side elevation showing a finished worm on an enlarged scale, the lower portion being broken away and shown in axial section.

In the accompanying drawing, the worm blank is indicated by the reference numeral 1 and the cutter by the reference numeral 2. The cutter may be a standard straight tooth gear shaper cutter having teeth 3 of involute or other form and a slightly re-entrant front face 4 ground back to conical form to provide the teeth with cutting rake.

The cutter has cutting edges 5 which are formed by intersection of the side faces of the teeth 3 with the conical front face 4.

In my copending application Serial No. 463,680 filed June 25, 1930, I have disclosed a method of cutting hour-glass worms by slowly feeding a gear shaper cutter tangentially across the face of a rotating blank.

The method of the present invention differs from that disclosed in the above mentioned copending application in that the blank is cut with a gear shaper cutter which is reciprocated axially across the face of the rotating blank and slowly fed toward the axis of the blank in a direction radial to the blank and at right angles to its own axis with the cutter rotating at a speed ratio with respect to the blank corresponding to the ratio of the number of teeth in the worm to be generated to the number of teeth in the cutter.

In the method of the present invention, as in the method of the application referred to, the worm is generated by the cutter in accordance with the molding generating principle of operation, the cutter and worm blank being continuously rotated during the generating operation at the speeds at which the cutter and worm to be generated would rotate if the cutter were in mesh with the worm and driven by the worm.

The cutting edges of the cutter conform to the surfaces of the tooth faces thereof and the generating action corresponds to the molding generating action of the teeth of a gear by reason of the axial cutting stroke of the cutter which is reciprocated across the blank.

As shown in Figs. 1 and 2 of the drawing, the cutter is disposed at the beginning of the cutting operation with its axis $a$—$a$ at an angle to the axis $b$—$b$ of the blank corresponding to the helix angle of the worm thread or threads to be generated in the blank, the periphery of the cutter being disposed tangentially with respect to the line $c$—$c$ tangent to the blank and parallel with the axis $a$—$a$.

During the cutting operation, the cutter and blank are continuously driven at relative speeds corresponding to the ratio between the number of teeth or threads of the worm to be generated and the number of teeth of the gear. The cutter is at the same time rapidly reciprocated, as is common practice in gear shaper machines, in an axial direction across the face of the blank, the cutter being moved a short distance in a direction away from the axis of the blank during the return stroke to clear the work.

While the rotating cutter is reciprocated, the cutter spindle or the work spindle is fed slowly in a direction radially with respect to the other spindle so that the depth of cut is gradually increased and the worm grooves are cut to the desired depth. The cutting operation above described may be performed with the shaper disclosed in my copending application Serial No. 443,185 by disposing the work spindle at an angle to the cutter spindle corresponding to the inclination of the threads of the worm to be generated with respect to the axis of the worm. With the spindles so disposed, the cutter and work spindles are rotated at the proper speed ratio and a rapid reciprocating motion imparted to the cutter spindle.

During the cutting operation, the work spindle may be slowly fed vertically toward the axis of the cutter spindle until the cutter enters to the desired depth in the blank. It should be noted that the feed movement of the cutter with respect to the work is in a direction radial with respect to the axis of the work spindle and that there is no feed of the cutter longitudinally of the blank. During the radial feed, the grooves in the blank are gradually deepened and widened, until the full depth is attained. In view of the fact that the feed of the cutter is in radial direction only, it will be apparent that the cutter will generate worm grooves which gradually increase in depth from the ends of the worm to the center thereof.

It will be readily apparent that the reciprocating and rotating cutter has a molding generating action corresponding to that of a spur gear on a cylinder of soft perfectly compressible material of the same size as the blank 1 and that the completed worm will mesh with a spur gear having the same number of teeth as the cutter of a form corresponding to the form of the cutter teeth 3, at their intersection with the front face 4 of the cutter and having its axis disposed at an angle to the axis of the worm corresponding to that of the generating cutter.

In cutting worms by the method above described, the spindles supporting the cutter and blank are geared together to provide a speed ratio corresponding to ratio between the number of threads or teeth of the worm and the number of teeth of the cutter and the blank and cutter are rotated at this speed ratio during the entire operation. If desired, however, the cutter may be fed to its final cutting position before the rotation of the blank and cutter is started, by reciprocating the cutter without turning movement across the face of the blank 1, which is held stationary and feeding the cutter radially toward the axis of the blank until the cutter is brought to its final generating position indicated by the line d—d in Fig. 1. In cutting worms by the modified method, the cutter and blank are geared together with the same speed ratio as in the method first described, but the driving mechanism is designed to rotate the blank at a very slow speed. After the cutter has been fed to depth, the rotation of the cutter and blank is started. The rapid reciprocation of the cutter is continued during the rotation and upon completion of one revolution of the blank, the worm is completely generated. In this modification of the method, the molding generating action of the cutter corresponds to the action of a gear on a cylinder of soft compressible material assuming that the gear is first pressed into the cylinder until its teeth are embedded to their full depth and the gear and cylinder are then rotated in this position at a speed ratio corresponding to the ratio between the number of threads of the worm and the number of teeth of the gear until the cylinder has made a complete revolution. The mating worm would be completely formed in the cylinder in one revolution of the cylinder by the molding action of the gear teeth. During the radial feed of the non-rotating axially reciprocating cutter, grooves are cut in the blank corresponding to those which would be formed by pressing a gear into a cylinder of compressible material and after the rotation of the cutter and blank has been started, the generating action of the cutter corresponds to the molding action of the gear rolling on the cylinder.

The worm generated by the present method will mesh with and very closely conform to gears mounted to rotate in the plane of the axis of the worm or at a lesser angle to said axis than that of the cutter during the generating operation, providing the gear is a helical gear with its teeth at a helix angle corresponding to the difference between the angle of the generating cutter to the axis of the blank and the angle of the gear to the axis of the worm.

The helical gear should be conjugate to the same rack as the cutter and should have one or more teeth less than the cutter due to the eliptical form of the cut made by the cutter across the face of the blank.

In practice, the worm will, in most instances, be designed to mesh with a given helical gear positioned with its plane of rotation axial with respect to the worm or at a small angle to the axis of the worm, in which case a cutter is selected which is conjugate to the rack of the gear, but which has a greater number of teeth than the gear, the number of teeth of the cutter in excess of the number of teeth of the gear being just sufficient to make the diameter of the cutter great enough to provide the necessary clearance between the periphery of the gear and the bottoms of the worm grooves.

As shown in Fig. 3 of the drawing, the finished worm has helical threads 6 and the bottoms 7 of the grooves between the threads are on a concave curve which is of greatest depth between the ends of the worm.

The concave curvature of the bottoms of the worm grooves measured in an axial plane are slightly eliptical due to the fact that the generating cutter is disposed with its cutting face at an angle to the axis of the blank. This eliptical curve, however, will conform very closely to a circle of slightly less diameter than that of the cutter.

It will be apparent that the present invention provides a very simple, rapid and economical method for generating worms of the hour-glass type designed to mesh with a given gear and that the worm is completely generated by feeding the reciprocating cutter radially into the blank to the required depth.

What I claim is:

1. The herein described method of generating hour-glass worms which consists in positioning the gear shaper cutter with the axis of the cutter in a position relative to the blank axis corresponding to the positions of the axes if the cutter were in mesh with the worm to be generated, and reciprocating the cutter across the face of the blank while the cutter and blank are being rotated at relative speeds corresponding to the ratio between the number of threads of the worm and the number of teeth of the cutter.

2. The herein described method of generating hour-glass worms which consists in positioning a straight tooth gear shaper cutter in intermeshing position with respect to the worm to be generated, reciprocating the cutter axially across the face of the blank, and simultaneously rotating the cutter and blank at relative speeds corresponding to the tooth ratio between the worm and cutter.

3. The herein described method of generating hour-glass worms which consists in so positioning a gear shaper cutter with respect to a worm blank that the teeth of the cutter in proximity to the blank extend in the direction of the worm threads to be generated, rotating the blank and cutter at relative speeds corresponding to the tooth ratio between the cutter and the worm to be generated, reciprocating the cutter across the face of the blank in the direction of the thread helix and slowly feeding the reciprocating and rotating cutter into the rotating blank in a direction radial with respect to the blank.

4. The herein described method of generating hour-glass worms which consists in positioning a straight tooth gear shaper cutter in proximity to a worm blank with the plane of the front face of the cutter normal to the thread helix measured in a plane perpendicular to said face, rotating the blank and cutter at relative speeds corresponding to the tooth ratio between the cutter and worm to be generated, reciprocating the cutter in an axial direction tangentially across the face of the blank, and slowly feeding the cutter radially towards the axis of the blank.

5. The herein described method of generating hour-glass worms adapted to mesh with a given helical gear, by means of a straight tooth gear shaper cutter which is conjugate to the rack of the helical gear and which has a greater number of teeth than the helical gear, which consists in positioning said cutter with its axis crossing the axis of the blank at an angle corresponding to the helix angle of a thread of the worm to be generated, and reciprocating the cutter axially across the face of the blank and feeding the cutter radially toward the axis of the blank to enter the teeth thereof to the desired depth in the blank while rotating the cutter and blank at relative speeds corresponding to the tooth ratio between the cutter and the worm to be generated.

6. The herein described method of generating hour-glass worms which consists in positioning a gear shaper cutter with its axis in a position relative to the blank axis corresponding to the positions of the axes if the cutter were in mesh with the worm to be generated, and relatively moving the cutter and blank to effect a relative reciprocation of the cutter across the face of the blank while the cutter and blank are being rotated at relative speeds corresponding to the ratio between the number of threads of the worm and the number of teeth of the cutter.

7. The herein described method of generating hour-glass worms which consists in positioning a straight tooth gear shaper cutter in intermeshing position with respect to the worm to be generated, relatively moving the cutter and blank to effect a relative reciprocation of the cutter axially across the face of the blank, and simultaneously rotating the cutter and blank at relative speeds corresponding to the tooth ratio between the worm and cutter.

8. The herein described method of generating hour-glass worms which consists in so positioning a gear shaper cutter with respect to a worm blank that the teeth of the cutter in proximity to the blank extend in the direction of the worm threads to be generated, rotating the blank and cutter at relative speeds corresponding to the tooth ratio between the cutter and the worm to be generated, relatively moving the cutter and blank to effect relative reciprocation of the cutter across the face of the blank in the direction of the thread helix, and slowly relatively moving the cutter and blank to effect a slow feed of the reciprocating and rotating cutter into the rotating blank in a direction radial to the blank.

9. The herein described method of generating hour-glass worms which consists in positioning a straight tooth gear shaper cutter in proximity to a worm blank with the plane of the front face of the cutter normal to the thread helix measured in a plane perpendicular to said face, rotating the blank and cutter at relative speeds corresponding to the tooth ratio between the cutter and worm to be generated, relatively moving the cutter and blank to effect a relative reciprocation of the cutter in an axial direction tangentially across the face of the blank, and slowly relatively feeding the cutter radially towards the axis of the blank.

10. The herein described method of generating hour-glass worms adapted to mesh with a given helical gear by means of a straight tooth gear shaper cutter which is conjugate to the rack of the helical gear and which has a greater number of teeth than the helical gear, which consists in positioning said cutter with its axis crossing the axis of the blank at an angle corresponding to the helix angle of the thread of the worm to be generated, relatively reciprocating the cutter and blank to cause the movement of the cutter axially across the face of the blank, and relatively moving the cutter and blank to feed the cutter radially towards the axis of the blank to enter the teeth thereof to the desired depth in the blank while rotating the cutter and blank at relative speeds corresponding to the tooth ratio between the cutter and the worm to be generated.

11. A method of generating throated gears consisting in positioning a gear shaper cutter with its axis transverse to the axis of the throated gear blank, reciprocating the cutter across the face of the blank in the direction of the cutter axis and in slowly rotating the cutter and blank in a timed relation corresponding to the ratio between the numbers of teeth in the cutter and blank respectively.

OLIVER G. SIMMONS.